UNITED STATES PATENT OFFICE.

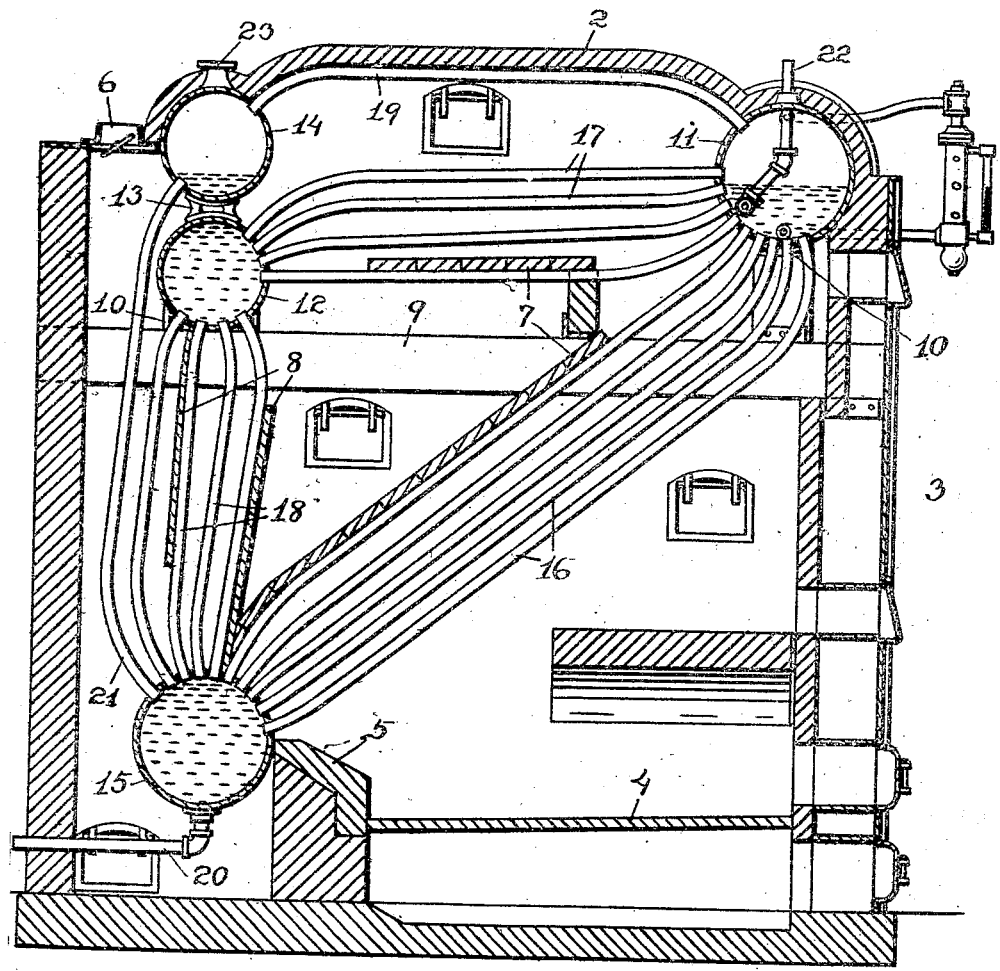

RALEIGH J. ADAMS, OF LOS ANGELES, CALIFORNIA.

STEAM-BOILER.

1,325,133.

Specification of Letters Patent.

Patented Dec. 16, 1919.

Application filed March 16, 1917, Serial No. 155,256. Renewed October 20, 1919. Serial No. 332,128.

*To all whom it may concern:*

Be it known that I, RALEIGH J. ADAMS, a citizen of the United States, resident of Los Angeles, in the county of Los Angeles and State of California, have made a certain new and useful Invention in Steam-Boilers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The figure of the drawing is a vertical section of the invention.

The invention has relation to steam boilers or generators of the inclined water tube type, having for its object to improve the circulation of water therein, and to reduce the formation of scale.

The invention consists in the novel construction and combinations of parts as hereinafter set forth.

In the accompanying drawings illustrating the invention, the numeral 2 designates the incasement, 3, the furnace, 4, the grate thereof, 5, the bridge wall, and 6 the outlet for products of combustion, all of the usual character.

7 and 8 designate baffles of suitable refractory material.

Supported from the horizontal beams 9 are saddles, 10, carrying a forward transverse steam and water drum 11, and a rear transverse water drum 12, the latter bearing thereupon a saddle 13 supporting in turn a steam drum 14, located immediately above the water drum. A lower mud drum 15 is located below the superposed water and steam drums in rear of the plant or furnace.

The mud drum is connected with the steam and water drum by a bank of tubes 16 inclined at an angle of approximately forty-five degrees; the steam and water drum is connected with the water drum by a bank of tubes 17, approximately horizontal, but having a slight downward inclination, and the water drum is connected with the mud drum by a bank of approximately vertical or upright tubes 18.

The steam and water drum is connected with the steam drum by a line of approximately horizontal tubes 19.

The steam in the steam and water drum passes over to the steam drum by the line of tubes 19, the water not converted into steam passing through the bank of tubes 17 to the water drum and thence to the mud drum, which is provided with the usual blow off 20.

A line of approximately vertical equalizer tubes 21 is usually provided between the steam drum and the mud drum.

The circulation of water is upward through the inclined bank of tubes 16 to the steam and water drum, thence rearwardly through the horizontal tubes 17 to the water drum, and downwardly therefrom to the mud drum, steam from the steam and water drum passing over through the upper line of tubes 19 to the steam drum, the latter being separate and apart from the water circulatory system, and being at one side connected with the steam and water drum and at the other side with the mud drum.

The water intake 22 is usually located in the steam and water drum, the steam outlet 23 being from the steam drum. The mud drum is hung from the banks of tubes and all parts of the boiler are free to expand and contract without interference.

The steam is disengaged from the water in the forward water and steam drum 11, said drum being located at the hottest part of the boiler, at the upper termination of the forwardly and upwardly inclined water tubes, or at the upper end of its first pass over the fire. These water tubes 16 being inclined at about forty-five degrees, may thereby be made longer than if inclined at a lower angle, the distance from one end to the other, horizontally, being constant, or the size and type of boiler being the same.

The equalizer tubes 21 enable me to equalize the water inside the boiler setting, dispensing with outside equalizers.

This boiler is designed to improve the water circulation, to eliminate pockets of water in the circulating system, and will drain completely of water when desired.

I claim:—

In a steam boiler, a forward transverse steam and water drum, a rear transverse cylindrical steam drum, a rear transverse cylindrical water drum directly below and spaced apart from said steam drum, substantially horizontal self-draining tubes connecting said steam and water drum with said water drum, a rear transverse mud drum, upright tubes connecting said water drum with said mud drum, inclined tubes connecting said mud drum with said steam and water drum, said steam drum having at one side thereof tubular connections with the steam and water drum and at its other side upright equalizer tubular connections with the mud drum.

In testimony whereof I affix my signature in presence of two witnesses.

RALEIGH J. ADAMS.

Witnesses:
 A. M. FOWLER,
 C. O. MERSHON.